(12) United States Patent
Suthar et al.

(10) Patent No.: US 10,505,718 B1
(45) Date of Patent: Dec. 10, 2019

(54) SYSTEMS, DEVICES, AND TECHNIQUES FOR REGISTERING USER EQUIPMENT (UE) IN WIRELESS NETWORKS USING A NATIVE BLOCKCHAIN PLATFORM

(71) Applicant: Cisco Technology, Inc., San Jose, CA (US)

(72) Inventors: Om Prakash Suthar, Bolingbrook, IL (US); Aeneas Sean Dodd-Noble, Andover, MA (US); Ammar Rayes, San Ramon, CA (US); Ian McDowell Campbell, Littleton, CO (US); Michael David Geller, Weston, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/134,887

(22) Filed: Sep. 18, 2018

Related U.S. Application Data

(60) Provisional application No. 62/682,770, filed on Jun. 8, 2018.

(51) Int. Cl.
| | | |
|---|---|---|
| H04L 29/06 | (2006.01) | |
| H04L 9/06 | (2006.01) | |
| H04W 12/06 | (2009.01) | |
| H04W 60/00 | (2009.01) | |
| H04W 88/02 | (2009.01) | |
| H04W 84/04 | (2009.01) | |

(52) U.S. Cl.
CPC .......... *H04L 9/0637* (2013.01); *H04L 63/102* (2013.01); *H04W 12/06* (2013.01); *H04W 60/00* (2013.01); *H04L 2209/38* (2013.01); *H04W 84/042* (2013.01); *H04W 88/02* (2013.01)

(58) Field of Classification Search
CPC .... H04W 12/06; H04L 9/0637; H04L 63/102; H04L 2209/38
See application file for complete search history.

(56) References Cited

U.S. PATENT DOCUMENTS

| | | |
|---|---|---|
| 4,236,068 A | 11/1980 | Walton |
| 5,642,303 A | 6/1997 | Small et al. |

(Continued)

FOREIGN PATENT DOCUMENTS

| | | |
|---|---|---|
| CN | 107079036 A | 8/2017 |
| CN | 107784748 A | 3/2018 |

(Continued)

OTHER PUBLICATIONS

"Cisco ASR 5x00 Mobility Management Entity Administration Guide," Version 15.0, Cisco Systems, Inc., Last updated Jun. 13, 2014, pp. 1-266.

(Continued)

*Primary Examiner* — Dao Q Ho
(74) *Attorney, Agent, or Firm* — Polsinelli PC

(57) ABSTRACT

A network function (NF) entity in a communication network determines a User Equipment (UE) supports a blockchain authentication procedure, exchanges authentication messages with a Blockchain Authentication Function (BAF) entity over a blockchain network interface (e.g., based on the blockchain authentication procedure), receives a blockchain authentication confirmation from the BAF entity, and registers the UE based on the blockchain authentication confirmation.

16 Claims, 7 Drawing Sheets

(56) References Cited

U.S. PATENT DOCUMENTS

| | | | |
|---|---|---|---|
| 5,751,223 | A | 5/1998 | Turner |
| 6,812,824 | B1 | 11/2004 | Goldinger et al. |
| D552,603 | S | 10/2007 | Tierney |
| 7,573,862 | B2 | 8/2009 | Chambers et al. |
| D637,569 | S | 5/2011 | Desai et al. |
| 7,975,262 | B2 | 7/2011 | Cozmei |
| 8,010,079 | B2 | 8/2011 | Mia et al. |
| 8,102,814 | B2 | 1/2012 | Rahman et al. |
| 8,260,320 | B2 | 9/2012 | Herz |
| 8,284,748 | B2 | 10/2012 | Borghei |
| 8,300,594 | B1 | 10/2012 | Bernier et al. |
| 8,325,626 | B2 | 12/2012 | Tóth et al. |
| 8,396,485 | B2 | 3/2013 | Grainger et al. |
| 8,446,899 | B2 | 5/2013 | Lei et al. |
| 8,457,145 | B2 | 6/2013 | Zimmerman et al. |
| 8,458,184 | B2 | 6/2013 | Dorogusker et al. |
| D691,636 | S | 10/2013 | Bunton |
| 8,549,638 | B2 | 10/2013 | Aziz |
| 8,553,634 | B2 | 10/2013 | Chun et al. |
| 8,644,301 | B2 | 2/2014 | Tamhankar et al. |
| 8,650,279 | B2 | 2/2014 | Mehta et al. |
| 8,669,902 | B2 | 3/2014 | Pandey et al. |
| 8,676,182 | B2 | 3/2014 | Bell et al. |
| 8,682,279 | B2 | 3/2014 | Rudolf et al. |
| 8,693,367 | B2 | 4/2014 | Chowdhury et al. |
| 8,718,644 | B2 | 5/2014 | Thomas et al. |
| 8,761,174 | B2 | 6/2014 | Jing et al. |
| 8,768,389 | B2 | 7/2014 | Nenner et al. |
| 8,849,283 | B2 | 9/2014 | Rudolf et al. |
| 8,909,698 | B2 | 12/2014 | Parmar et al. |
| 8,958,318 | B1 | 2/2015 | Hastwell et al. |
| 9,060,352 | B2 | 6/2015 | Chan et al. |
| 9,130,859 | B1 | 9/2015 | Knappe |
| 9,173,084 | B1 | 10/2015 | Foskett |
| 9,173,158 | B2 | 10/2015 | Varma |
| D744,464 | S | 12/2015 | Snyder et al. |
| 9,270,709 | B2 | 2/2016 | Shatzkamer et al. |
| 9,271,216 | B2 | 2/2016 | Friman et al. |
| 9,281,955 | B2 | 3/2016 | Moreno et al. |
| D757,424 | S | 5/2016 | Phillips et al. |
| D759,639 | S | 6/2016 | Moon et al. |
| 9,369,387 | B2 | 6/2016 | Filsfils et al. |
| 9,389,992 | B2 | 7/2016 | Gataullin et al. |
| 9,426,305 | B2 | 8/2016 | De Foy et al. |
| D767,548 | S | 9/2016 | Snyder et al. |
| 9,467,918 | B1 | 10/2016 | Kwan |
| D776,634 | S | 1/2017 | Lee et al. |
| 9,544,337 | B2 | 1/2017 | Eswara et al. |
| 9,569,771 | B2 | 2/2017 | Lesavich et al. |
| 9,609,504 | B2 | 3/2017 | Karlqvist et al. |
| 9,615,268 | B2 | 4/2017 | Navarro et al. |
| 9,634,952 | B2 | 4/2017 | Gopinathan et al. |
| 9,642,167 | B1 | 5/2017 | Snyder et al. |
| 9,654,344 | B2 | 5/2017 | Chan et al. |
| 9,712,444 | B1 | 7/2017 | Bolshinsky et al. |
| 9,713,114 | B2 | 7/2017 | Yu |
| 9,736,056 | B2 | 8/2017 | Vasseur et al. |
| 9,762,683 | B2 | 9/2017 | Karampurwala et al. |
| 9,772,927 | B2 | 9/2017 | Gounares et al. |
| 9,820,105 | B2 | 11/2017 | Snyder et al. |
| D804,450 | S | 12/2017 | Spiel et al. |
| 9,858,559 | B2 | 1/2018 | Raleigh et al. |
| 9,860,151 | B2 | 1/2018 | Ganichev et al. |
| 9,933,224 | B2 | 2/2018 | Dumitriu et al. |
| 9,923,780 | B2 | 3/2018 | Rao et al. |
| 9,961,560 | B2 | 5/2018 | Farkas et al. |
| 9,967,906 | B2 | 5/2018 | Verkaik et al. |
| 9,980,220 | B2 | 5/2018 | Snyder et al. |
| 9,985,837 | B2 | 5/2018 | Rao et al. |
| 9,998,368 | B2 | 6/2018 | Chen et al. |
| 10,108,954 | B2 | 10/2018 | Dunlevy et al. |
| 10,123,202 | B1 * | 11/2018 | Polehn .................. H04W 8/183 |
| 10,164,779 | B2 | 12/2018 | Uhr |
| 10,171,248 | B2 | 1/2019 | King |
| 2003/0087645 | A1 | 5/2003 | Kim et al. |
| 2003/0116634 | A1 | 6/2003 | Tanaka |
| 2004/0029576 | A1 | 2/2004 | Flykt et al. |
| 2004/0203572 | A1 | 10/2004 | Aerrabotu et al. |
| 2005/0090225 | A1 | 4/2005 | Muehleisen et al. |
| 2005/0169193 | A1 | 8/2005 | Black et al. |
| 2005/0186904 | A1 | 8/2005 | Kowalski et al. |
| 2006/0022815 | A1 | 2/2006 | Fischer et al. |
| 2006/0030290 | A1 | 2/2006 | Rudolf et al. |
| 2006/0092964 | A1 | 5/2006 | Park et al. |
| 2006/0126882 | A1 | 6/2006 | Deng et al. |
| 2006/0146803 | A1 | 7/2006 | Bae et al. |
| 2006/0187866 | A1 | 8/2006 | Werb et al. |
| 2006/0245406 | A1 | 11/2006 | Shim |
| 2007/0037605 | A1 | 2/2007 | Logan |
| 2007/0130471 | A1 | 6/2007 | Walker Pina et al. |
| 2007/0239854 | A1 | 10/2007 | Janakiraman et al. |
| 2008/0037715 | A1 | 2/2008 | Prozeniuk et al. |
| 2008/0084888 | A1 | 4/2008 | Yadav et al. |
| 2008/0101381 | A1 | 5/2008 | Sun et al. |
| 2008/0163207 | A1 | 7/2008 | Reumann et al. |
| 2008/0233969 | A1 | 9/2008 | Mergen |
| 2009/0129389 | A1 | 5/2009 | Halna DeFretay et al. |
| 2009/0203370 | A1 | 8/2009 | Giles et al. |
| 2009/0282048 | A1 | 11/2009 | Ransom et al. |
| 2009/0298511 | A1 | 12/2009 | Paulson |
| 2009/0307485 | A1 | 12/2009 | Weniger et al. |
| 2010/0039280 | A1 | 2/2010 | Holm et al. |
| 2010/0097969 | A1 | 4/2010 | De Kimpe et al. |
| 2011/0087799 | A1 | 4/2011 | Padhye et al. |
| 2011/0142053 | A1 | 6/2011 | Van Der Merwe et al. |
| 2011/0182295 | A1 | 7/2011 | Singh et al. |
| 2011/0194553 | A1 | 8/2011 | Sahin et al. |
| 2011/0228779 | A1 | 9/2011 | Goergen |
| 2012/0023552 | A1 | 1/2012 | Brown et al. |
| 2012/0054367 | A1 | 3/2012 | Ramakrishnan et al. |
| 2012/0088476 | A1 | 4/2012 | Greenfield |
| 2012/0115512 | A1 | 5/2012 | Grainger et al. |
| 2012/0157126 | A1 | 6/2012 | Rekimoto |
| 2012/0167207 | A1 | 6/2012 | Beckley et al. |
| 2012/0182147 | A1 | 7/2012 | Forster |
| 2012/0284777 | A1 | 11/2012 | Eugenio et al. |
| 2012/0311127 | A1 | 12/2012 | Kandula et al. |
| 2012/0324035 | A1 | 12/2012 | Cantu et al. |
| 2013/0029685 | A1 | 1/2013 | Moshfeghi |
| 2013/0039391 | A1 | 2/2013 | Skarp |
| 2013/0057435 | A1 | 3/2013 | Kim |
| 2013/0077612 | A1 | 3/2013 | Khorami |
| 2013/0088983 | A1 | 4/2013 | Pragada et al. |
| 2013/0107853 | A1 | 5/2013 | Pettus et al. |
| 2013/0108263 | A1 | 5/2013 | Srinivas et al. |
| 2013/0115916 | A1 | 5/2013 | Herz |
| 2013/0145008 | A1 | 6/2013 | Kannan et al. |
| 2013/0155906 | A1 | 6/2013 | Nachum et al. |
| 2013/0191567 | A1 | 7/2013 | Rofougaran et al. |
| 2013/0203445 | A1 | 8/2013 | Grainger et al. |
| 2013/0217332 | A1 | 8/2013 | Altman et al. |
| 2013/0232433 | A1 | 9/2013 | Krajec et al. |
| 2013/0273938 | A1 | 10/2013 | Ng et al. |
| 2013/0317944 | A1 | 11/2013 | Huang et al. |
| 2013/0322438 | A1 | 12/2013 | Gospodarek et al. |
| 2013/0343198 | A1 | 12/2013 | Chhabra et al. |
| 2013/0347103 | A1 | 12/2013 | Veteikis et al. |
| 2014/0007089 | A1 | 1/2014 | Bosch et al. |
| 2014/0016926 | A1 | 1/2014 | Soto et al. |
| 2014/0025770 | A1 | 1/2014 | Warfield et al. |
| 2014/0031031 | A1 | 1/2014 | Gauvreau et al. |
| 2014/0052508 | A1 | 2/2014 | Pandey et al. |
| 2014/0059655 | A1 | 2/2014 | Beckley et al. |
| 2014/0087693 | A1 | 3/2014 | Walby et al. |
| 2014/0105213 | A1 | 4/2014 | A K et al. |
| 2014/0118113 | A1 | 5/2014 | Kaushik et al. |
| 2014/0148196 | A1 | 5/2014 | Bassan-Eskenazi et al. |
| 2014/0179352 | A1 | 6/2014 | V.M. et al. |
| 2014/0191868 | A1 | 7/2014 | Ortiz et al. |
| 2014/0198808 | A1 | 7/2014 | Zhou |
| 2014/0222997 | A1 | 8/2014 | Mermoud et al. |
| 2014/0233460 | A1 | 8/2014 | Pettus et al. |
| 2014/0269321 | A1 | 9/2014 | Kamble et al. |
| 2014/0302869 | A1 | 10/2014 | Rosenbaum et al. |

(56) References Cited

U.S. PATENT DOCUMENTS

| | | | |
|---|---|---|---|
| 2014/0337824 | A1 | 11/2014 | St. John et al. |
| 2014/0341568 | A1 | 11/2014 | Zhang et al. |
| 2015/0016286 | A1 | 1/2015 | Ganichev et al. |
| 2015/0016469 | A1 | 1/2015 | Ganichev et al. |
| 2015/0023176 | A1 | 1/2015 | Korja et al. |
| 2015/0030024 | A1 | 1/2015 | Venkataswami et al. |
| 2015/0043581 | A1 | 2/2015 | Devireddy et al. |
| 2015/0063166 | A1 | 3/2015 | Sif et al. |
| 2015/0065161 | A1 | 3/2015 | Ganesh et al. |
| 2015/0087330 | A1 | 3/2015 | Prechner et al. |
| 2015/0103818 | A1 | 4/2015 | Kuhn et al. |
| 2015/0163192 | A1 | 6/2015 | Jain et al. |
| 2015/0172391 | A1 | 6/2015 | Kasslin et al. |
| 2015/0223337 | A1 | 8/2015 | Steinmacher-Burow |
| 2015/0256972 | A1 | 9/2015 | Markhovsky et al. |
| 2015/0264519 | A1 | 9/2015 | Mirzaei |
| 2015/0280827 | A1 | 10/2015 | Adiletta et al. |
| 2015/0288410 | A1 | 10/2015 | Adiletta et al. |
| 2015/0326704 | A1 | 11/2015 | Ko et al. |
| 2015/0358777 | A1 | 12/2015 | Gupta |
| 2015/0362581 | A1 | 12/2015 | Friedman et al. |
| 2015/0379510 | A1 | 12/2015 | Smith |
| 2016/0007315 | A1 | 1/2016 | Lundgreen et al. |
| 2016/0044627 | A1 | 2/2016 | Aggarwal et al. |
| 2016/0099847 | A1 | 4/2016 | Melander et al. |
| 2016/0100395 | A1 | 4/2016 | Xu et al. |
| 2016/0105408 | A1 | 4/2016 | Cooper et al. |
| 2016/0127875 | A1 | 5/2016 | Zampini, II |
| 2016/0146495 | A1 | 5/2016 | Malve et al. |
| 2016/0330045 | A1 | 11/2016 | Tang et al. |
| 2016/0344641 | A1 | 11/2016 | Javidi et al. |
| 2017/0026974 | A1 | 1/2017 | Dey et al. |
| 2017/0116693 | A1 | 4/2017 | Rae et al. |
| 2017/0164212 | A1 | 6/2017 | Opsenica et al. |
| 2017/0177898 | A1 | 6/2017 | Dillenberger |
| 2017/0180134 | A1 | 6/2017 | King |
| 2017/0180999 | A1 | 6/2017 | Alderfer et al. |
| 2017/0181136 | A1 | 6/2017 | Bharadwaj et al. |
| 2017/0195205 | A1 | 7/2017 | Li et al. |
| 2017/0202000 | A1 | 7/2017 | Fu et al. |
| 2017/0214551 | A1 | 7/2017 | Chan et al. |
| 2017/0214675 | A1 | 7/2017 | Johnsrud et al. |
| 2017/0243208 | A1 | 8/2017 | Kurian et al. |
| 2017/0273083 | A1 | 9/2017 | Chen et al. |
| 2017/0302663 | A1 | 10/2017 | Nainar et al. |
| 2017/0317997 | A1* | 11/2017 | Smith ................... H04L 9/0861 |
| 2017/0330179 | A1 | 11/2017 | Song et al. |
| 2017/0330180 | A1 | 11/2017 | Song et al. |
| 2017/0332421 | A1* | 11/2017 | Sternberg ............... H04W 76/11 |
| 2017/0339706 | A1 | 11/2017 | Andreoli-Fang et al. |
| 2017/0364700 | A1 | 12/2017 | Goldfarb et al. |
| 2018/0060835 | A1 | 3/2018 | Martin |
| 2018/0063018 | A1 | 3/2018 | Bosch et al. |
| 2018/0069311 | A1 | 3/2018 | Pallas et al. |
| 2018/0082076 | A1 | 3/2018 | Murray |
| 2018/0084389 | A1 | 3/2018 | Snyder et al. |
| 2018/0084427 | A1 | 3/2018 | Huo |
| 2018/0136633 | A1 | 5/2018 | Small et al. |
| 2018/0137512 | A1* | 5/2018 | Georgiadis ............ H04L 9/3239 |
| 2018/0139056 | A1 | 5/2018 | Imai et al. |
| 2018/0139107 | A1 | 5/2018 | Senarath et al. |
| 2018/0197173 | A1 | 7/2018 | Durvasula et al. |
| 2018/0212970 | A1 | 7/2018 | Chen et al. |
| 2018/0253539 | A1 | 9/2018 | Minter et al. |
| 2018/0287806 | A1 | 10/2018 | Carboni et al. |
| 2018/0294966 | A1 | 10/2018 | Hyun et al. |
| 2018/0294977 | A1 | 10/2018 | Uhr et al. |
| 2018/0343128 | A1 | 11/2018 | Uhr et al. |
| 2018/0374094 | A1 | 12/2018 | Kohli et al. |
| 2019/0005470 | A1 | 1/2019 | Uhr et al. |
| 2019/0012695 | A1 | 1/2019 | Bishnoi et al. |
| 2019/0058709 | A1 | 2/2019 | Kempf et al. |

FOREIGN PATENT DOCUMENTS

| | | |
|---|---|---|
| WO | WO 2013/020126 | 2/2013 |
| WO | WO 2014/098556 | 6/2014 |
| WO | WO 2015/131920 | 9/2015 |
| WO | 2017078657 A1 | 5/2017 |
| WO | WO 2017/187011 | 11/2017 |
| WO | WO 2017187397 | 11/2017 |
| WO | WO 2018/009340 | 1/2018 |
| WO | WO 2018/028777 | 2/2018 |
| WO | 2018053271 A1 | 3/2018 |
| WO | WO 2018/066362 | 4/2018 |

OTHER PUBLICATIONS

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: CISCO Mobility Services Engine," Cisco Systems, Inc., Updated Apr. 20, 2015, 8 pages.

"I Love WiFi, The difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Antonioli, Roberto, et al., "Dual Connectivity for LTE-NR Cellular Networks," Research Gate, Sep. 3-6, 2017, pp. 171-175.

Bekan, Adnan, et al., "D5.1: Machine Learning Algorithms Development and Implementation," 2016-2018 eWINE Consortium, 23, 2016, pp. 1-72.

Bogale, Tadilo Endeshaw, et al., "Machine Intelligence Techniques for Next-Generation Context-Aware Wireless Networks," arxiv.org, Jan. 12, 2018, pp. 1-10.

Carter, Steve Sr., "E911 VoIP Essentials For Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cheng, W., et al., "Path Segment in MPLS Based Sement Routing Network," Network Working Group, Oct. 2017, pp. 1-10.

Christidis, Konstantinos, et al., "Blockchains and Smart Contracts for the Internet of Things," IEEE Access, Special Section on the of Research in Internet of Things (IoT), vol. 4, May 10, 2016, pp. 1-12.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Doyle, Matthew G., "An IP Address Management Solution for a Server Solution Provider," A Dissertation Submitted to The University of Liverpool, Sep. 28, 2005, 116 pages.

Galvan T., Carlos E., et al., "Wifi bluetooth based combined positioning algorithm," International Meeting of Electrical Engineering Research ENIINVIE 2012, Procedia Engineering 35 (2012 ), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

(56) References Cited

OTHER PUBLICATIONS

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Herb, Daniel, et al., "ROAUM: How to Unblock ROAMING IoT Using BLockchain," available at https://uploads-ssl.webflow.com/5987a08baeea4300016b7bd9/5a7a6d6cee5bc400010a08f2_Roaum_Roaming_IoT_Whitepaper.pdf, pp. 1-14.

Hsieh, Cynthia, "Location Awareness in VMware View 4.5 and Above," VMware, 2011, 8 pages.

Husain, Syed, et al., "Mobile Edge Computing with Network Resource Slicing for Internet-of-Things," IEEE 2017, pp. 1-7.

Jero, Samuel, et al., "Identifier Binding Attacks and Defenses in Software-Defined Networks," USENIX, The Advanced Computing Systems Association, Aug. 16-18, 2017, 19 pages.

Ji, Philip N., et al., "Demonstration of High-Speed MIMO OFDM Flexible Bandwidth Data Center Network," Optical Society of America, 2012, 2 pages.

Kandula, Srikanth, et al., "Flyways To De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Leonhardt, Ulf, "Supporting Location-Awareness in Open Distributed Systems," May 1998, 186 pages.

Morozov, Yury, "Blockchain Telecom: Bubbletone Blockchain," Dec. 29, 2017, pp. 1-33.

Network Heresy, "NVGRE, VXLAN and What Microsoft is Doing Right," Oct. 3, 2011, 5 pages.

Norwegian National Security Authority, "N-03 Security guidance for switches and routers," Sep. 26, 2012, pp. 1-24.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Shwetha, D., et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.

Sun, et al., "The future of Wi-Fi," IEEE Communications Magazine, vol. 52, No. 11, Nov. 21, 2014, 166 pages.

Ventre, Pier Luigi, et al., "Performance Evaluation and Tuning of Virtual Infrastructure Managers for (Micro) Virtual Network Functions," ieee.org, Nov. 7-10, 2016, pp. 1-7.

Wright, Joshua, "Detecting Wireless LAN MAC Address Spoofing," Jan. 21, 2003, pp. 1-20.

Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

Abdulqadder, Ihsan H., et al, "Deployment Of Robust Security Scheme In SDN Based 5G Network Over NFV Enabled Cloud Environment," IEEE, 2018, pp. 1-12.

Blockchain @ Telco: How blockchain can impact the telecommunications industry and its relevance to the C-Suite, Monitor Deloitte, Jun. 20, 2018, 13 pages.

Kaloxylos, Alexandros, "A Survey and an Analysis of Network Slicing in 5G Networks," IEEE Communications Standards Magazine, Mar. 2018, pp. 60-65.

Leukert, Bernd, et al., "IoT 2020: Smart and secure IoT platform," International Electrotechnical Commission, Oct. 11, 2016, 181 pages.

Lin, Jun, et al., "Using blockchain to build trusted LoRaWAN sharing server," Emeraldinsight.com, Sep. 7, 2017, pp. 1-15.

Moinet, Axel, et al., "Blockchain based trust & authentication for decentralized sensor networks," Jun. 6, 2017, 6 pages.

Yang, Hui, et al., "Blockchain-based trusted authentication in cloud radio over fiber network for 5g," Optical Communications and Networks (ICOCN), 2017 $16^{th}$ International Conference on IEEE, 2017, 3 pages.

International Search Report and Written Opinion from the International Searching Authority, dated Sep. 16, 2019, 12 pages, for corresponding International Patent Application No. PCT/US2019/036144.

International Search Report and Written Opinion from the International Searching Authority, dated Sep. 18, 2019, 11 pages, for corresponding International Patent Application No. PCT/US2019/036164.

"$3^{rd}$ Generation Partnership Project; Technical Specification Group Services and System Aspects; Procedures for the 5G System; Stage 2 (Release 15)," 3GPP TS 23.502 V15.1.0, Mar. 27, 2018, 285 pages.

Amann, David, "Konzeption eines Blockchain-basierten Triple-A-Systems und Implementierung als EAP-Erweiterung zur Authentifizierung über," IEEE 802.1X, Sep. 27, 2017, 100 pages.

Kiyomoto, Shinsaku, et al., "On Blockchain-Based Authorization Architecture for Beyond-5G Mobile Services," The $12^{the}$ International Conference for Internet Technology and Secured Transactions (ICITST-2017), Dec. 11, 2017, pp. 136-141.

Raju, Savaranan, et al., "Identity Management using Blockchain for Cognitive Cellular Networks," IEEE ICC 2017 Communication and Information Systems Security Symposium, May 21, 2017, 6 pages.

* cited by examiner

SYSTEMS, DEVICES, AND TECHNIQUES FOR REGISTERING USER EQUIPMENT (UE) IN WIRELESS NETWORKS USING A NATIVE BLOCKCHAIN PLATFORM

CROSS-REFERENCE TO RELATED APPLICATIONS

This application claims benefit to U.S. provisional application No. 62/682,770, filed on Jun. 8, 2018, which is expressly incorporated by reference herein in its entirety.

TECHNICAL FIELD

The present subject matter relates generally to communication networks, and more particularly, to natively integrating blockchain technologies in the context of registering User Equipment (UE) in telecommunication networks (e.g., 4G, 5G, etc.)

BACKGROUND

An ever-increasing consumer demand, improved technological advancements (e.g., hardware/software infrastructure), and industry collaboration has driven significant growth in modern telecommunication networks and continues to drive its evolution. Indeed, each iteration or "next generation" of network capabilities, e.g., represented by standards promulgated by a Third Generation Partnership Project (3GPP), interconnects more devices, improves network bandwidth, increases data-rates, and so on. For example, a transition from $3^{rd}$ Generation (3G) networks to $4^{th}$ Generation (4G) networks introduced new network services and connected mobile devices to third party data networks such as the Internet. More recently, a transition is underway from existing 4G networks to new 5G networks, which includes a new service-oriented architecture for pro-visioning network services/resources in a dynamic, scalable, and customizable fashion (e.g., micro-services, network functions virtualization (NFV), etc.). For example, this service-oriented architecture supports network slices, which employ an isolated set of programmable resources that can implement individual network functions and/or application services through software programs within a respective network slice, without interfering with other functions and services on coexisting network slices. In turn, the service-oriented architecture, including its network slice implementation, creates opportunities to employ new mechanisms that natively support such dynamic and flexible workload pro-visioning and improve overall UE mobility.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
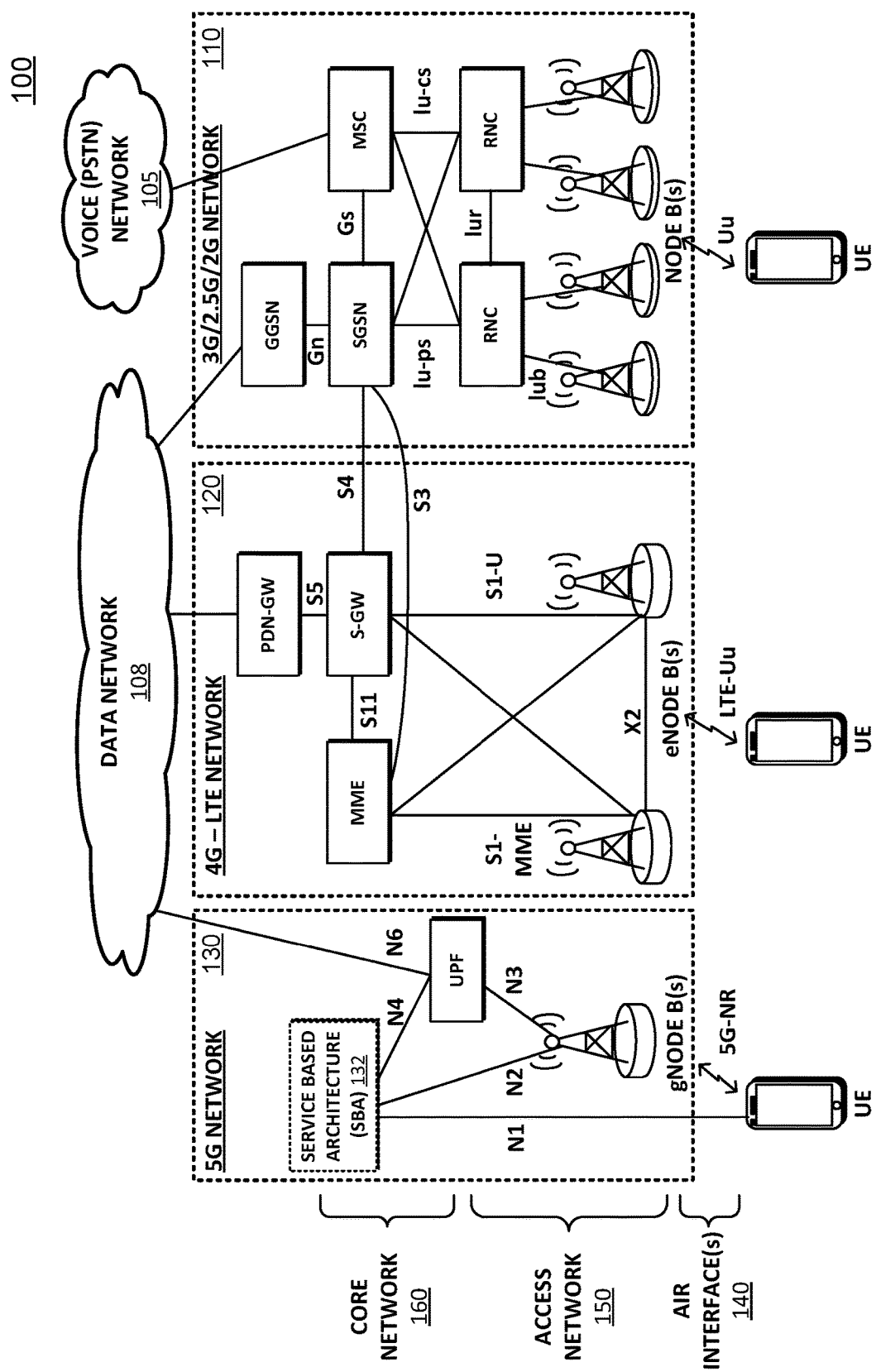
FIG. 1 illustrates a schematic block diagram of exemplary telecommunication networks, including a 3G network, a 4G network, and a 5G network.

This disclosure describes techniques for registering User Equipment (UE) in a telecommunication network (e.g., 4G/5G networks, etc.) using a natively integrated blockchain platform. In particular, the techniques can support complimentary or substitute blockchain authentication procedures for any User Equipment (UE) attaching to a 5G network. For example, according to one or more embodiments of this disclosure, a network function (NF) entity in a communication network determines a UE supports a blockchain authentication procedure. The NF entity exchanges authentication messages with a Blockchain Authentication Function (BAF) entity over a blockchain network interface and receives a blockchain authentication confirmation from the BAF entity. The NF entity further registers the UE based on the blockchain authentication confirmation. In some embodiments, the NF entity can include an Access and Mobility Management Function (AMF) entity and/or an Authentication Server Function (AUSF) entity. Notably, the AMF entity may communicate directly with the BAF entity over the blockchain network interface and/or the AMF entity can invoke the AUSF entity to perform the authentication procedure and communicate with the BAF entity over another blockchain network interface.

Description

Various embodiments of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), which include a number of network devices/modules/entities or "Network Function(s)" (NF(s)), as is appreciated by those skilled in the art. For sake of clarity, the NFs described herein are based on NFs specified by existing Technical Specifications such as the 3GPP TS 23.501, TS 23.502, TS 24.501, TS 29.509, TS 29.518, TS 33.301, TS 33.501, each of which is incorporated herein by reference to its entirety. Moreover, while some operations and functionality may be described and/or attributed to a particular NF, it is appreciated that such operations are not intended to be limited to the particular NF, but may be performed by other NFs as appropriate, particularly in view of the ongoing development and evolving nature of telecommunication networks.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

FIG. 1 illustrates a schematic block diagram of exemplary telecommunication networks 100, including a 3G network 110, a 4G network 120, and 5G network 130. Telecommunication networks 100 include wireless network interfaces or communication links, such as air interfaces 140, an access network 150, which represents radio infrastructure or radio towers, and a core network 160, which represents respective core network entities, network modules, or Network Functions (NF(s)). The wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 100, including respective interconnected network entities, are illustrated and described herein for purposes of discussion, not limitation, and it is appreciated that the illustrated networks can include (or exclude) any number of network entities, communication links, and the like, and can support inter-network operability and compatibility.

Access network 150 represents the infrastructure or radio towers, such as a Radio Access Network (RAN), for receiving and transmitting data packets between end user nodes (UE) as well as the various network entities (e.g., core network entities). Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks.

Respective network entities that form core network 160 (within the telecommunication networks 100) operatively connect respective RAN infrastructure (NBs, eNBs, gNBs) to third party networks such as a voice network 105 (e.g., a Public Switched Telephone Network (PSTN) network) and/or a data network 108 to create end-to-end connections. Prior to 3G (e.g., 2G, 2.5G, etc.) the third party network primarily included a voice network/PSTN 105 (e.g., a circuit switched network). From 3G onward, the third party network transitioned to include a public network (e.g., the Internet), represented by data network 108 (e.g., a packet switched network). Core network 160 and its respective network entities collectively operate to manage connections, bandwidth, and mobility for respective UE.

Notably, core network 160 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 110, session management includes a standalone General Packet Radio Service (GPRS) network, while 4G network 120 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

5G network 130, as discussed in greater detail herein, introduces a new service base architecture (SBA) 132, which generally redistributes functionality of 4G network entities into smaller service-based functions/network entities. In addition, packet routing and forwarding functions (which are performed by SGW and PGW in 4G network 120) are realized as services rendered through a new network function/entity called the User Plane Function (UPF). In this fashion, 5G network 130 provides a modular set of services that support dynamic and scalable deployment of resources to satisfy diverse user demands.

Figure 2:
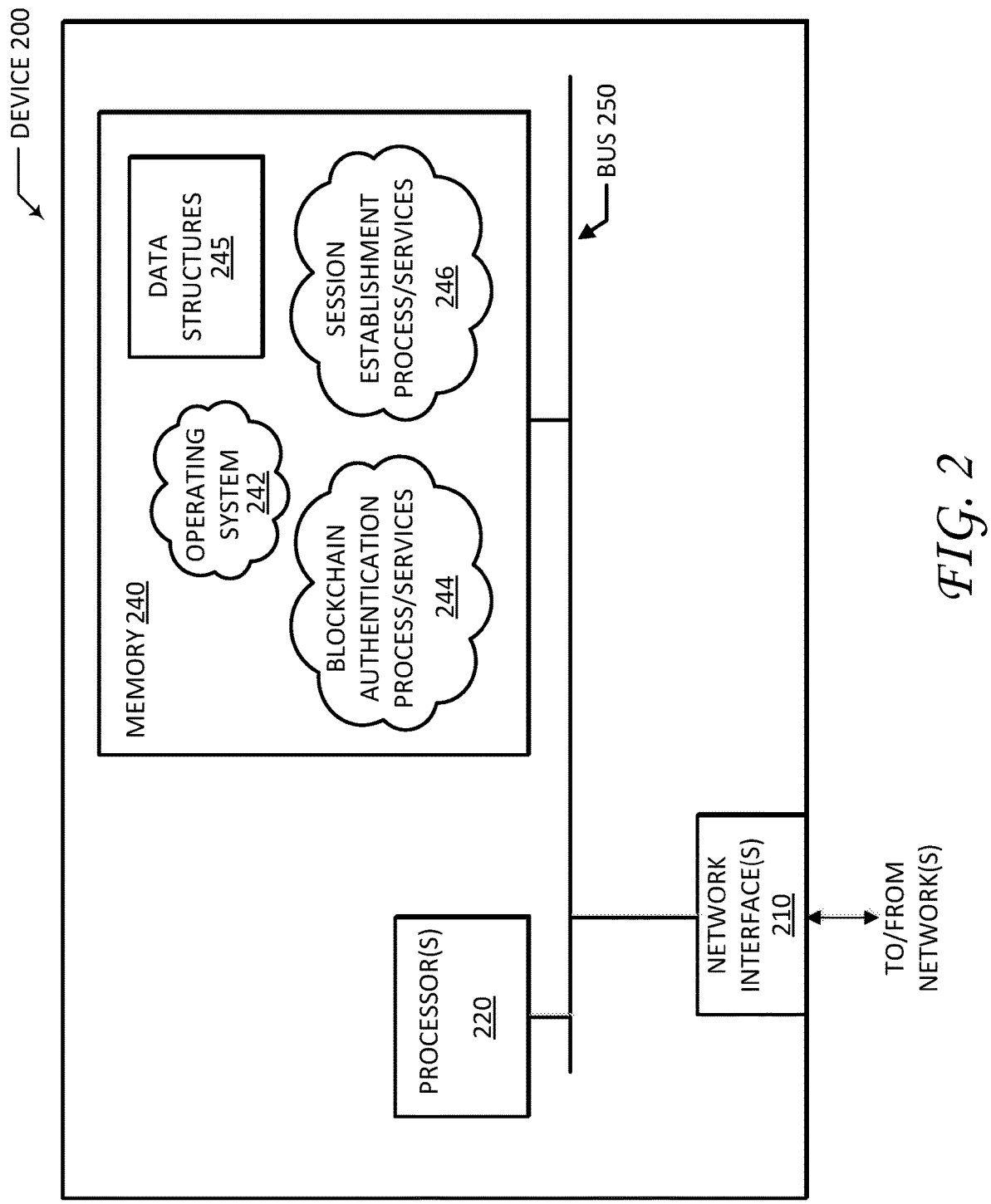
FIG. 2 illustrates a schematic block diagram of an exemplary network device, such as a Network Function (NF) entity/module, according to one or more embodiments of this disclosure.

FIG. 2 illustrates a schematic block diagram of an exemplary network device or Network Function (NF) 200 that may be used with one or more embodiments described herein, e.g., particularly as User Equipment (UE) and/or other NFs within SBA 132 (e.g., an Access and Mobility Management Function (AMF) entity, Authentication Server Function (AUSF) entity, and so on).

The illustrative device 200 comprises one or more network interfaces 210, at least one processor 220, and a memory 240 interconnected by a system bus 250. Network interface(s) 210 contain the mechanical, electrical, and signaling circuitry for communicating data over links (e.g., wires or wireless links) within the telecommunication networks 100 (e.g., ref. FIG. 1). Network interfaces 210 may be configured to transmit and/or receive data using a variety of different communication protocols, as will be understood by those skilled in the art. Notably, network interfaces 210 may include new blockchain network interfaces (e.g., "BCx", "BCy", and/or "BCz") as discussed in greater detail below.

Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of services and/or software processes executing on the device/module. These services and/or software processes may comprise an illustrative "block chain registration" process/service 244 as well as "session establishment" process/services 246, as described herein. Note that while processes/services 244 and 246 are shown in centralized memory 240, some embodiments provide for these processes/services to be operated in a distributed communication network.

Illustratively, the techniques described herein may be performed by hardware, software, and/or firmware, such as in accordance with the illustrative blockchain authentication process 244 and/or the illustrative session establishment process 246, which may contain computer executable instructions executed by processor 220 to perform functions relating to UE authentication and/or UE session establishment described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having blockchain registration process 244 and/or session establishment process 246 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, a transition is currently underway from existing 4G networks to new 5G networks, which includes a new service-oriented architecture (e.g., SBA 132—FIG. 1). Traditional processes employed by 3G and 4G networks to provision network resource and support UE mobility (e.g., registration, session establishment, session maintenance) were developed and optimized based on then-existing voice network (e.g., circuit-switched) infrastructure and/or conventional data network (e.g., packet switched) infrastructure. However, the 5G network introduces new infrastructure that supports the service-oriented architecture, which can provision network services/resources in a dynamic, scalable, and customizable fashion using, for example, network slices, micro-services, network functions virtualization (NFV), and so on. In the context of a network slice, each network slice can include an isolated set of programmable resources that may implement individual network functions and/or application services through software programs within a respective network slice, without interfering with other functions and services on coexisting network slices.

With respect to dynamic network resource and/or workload provisioning, the 5G network also supports additional processes and procedures for UE registration, session establishment, session maintenance, and so on, which can improve network services for a variety of devices with very different quality of service (QoS) requirements. For example, as disclosed herein, this disclosure provides complimentary and/or alternative mechanisms—e.g., blockchain registration capabilities—to natively support such dynamic and flexible workload provisioning and improve overall UE mobility.

Blockchain technologies generally facilitate transparent, verifiable, and secure digital asset transactions with proof of rights and ownership. For example, blockchain technologies generally employ distributed ledger technology (DLT) with built-in cryptography to enable open and trusted exchanges over the internet without requiring central servers and/or independent trusted authorities. However, despite its advantages, existing protocols/network architectures in the telecommunications context generally fail to support native blockchain technologies due, in part, to underlying security requirements for initial registration processes. Blockchain technologies can be employed within existing telecommunication networks, however mobile network operators and/or mobile network entities are generally unaware of blockchain transactions because such blockchain transactions generally only occur after a mobile session is established (e.g., using overlay messages), which in turn, inhibits blockchain technology integration and participation by mobile service providers.

Accordingly, as described in greater detail herein, embodiments of this disclosure provide a native blockchain platform that employs blockchain operations that can serve as additional and/or alternative registration processes within a mobile network, and that further operates in conjunction with various mobile Network Functions (NFs) or network entities (including UE) over new blockchain network interfaces. In particular, these blockchain authentication operations may satisfy security requirements for network service providers, and can provide access to a variety of new types of devices/users. In addition, the native blockchain platform of this disclosure also supports device registration in the context of a roaming network—e.g., when UE is outside of its local/home network and attempts to connect to a roaming/visiting network.

Figure 3A:
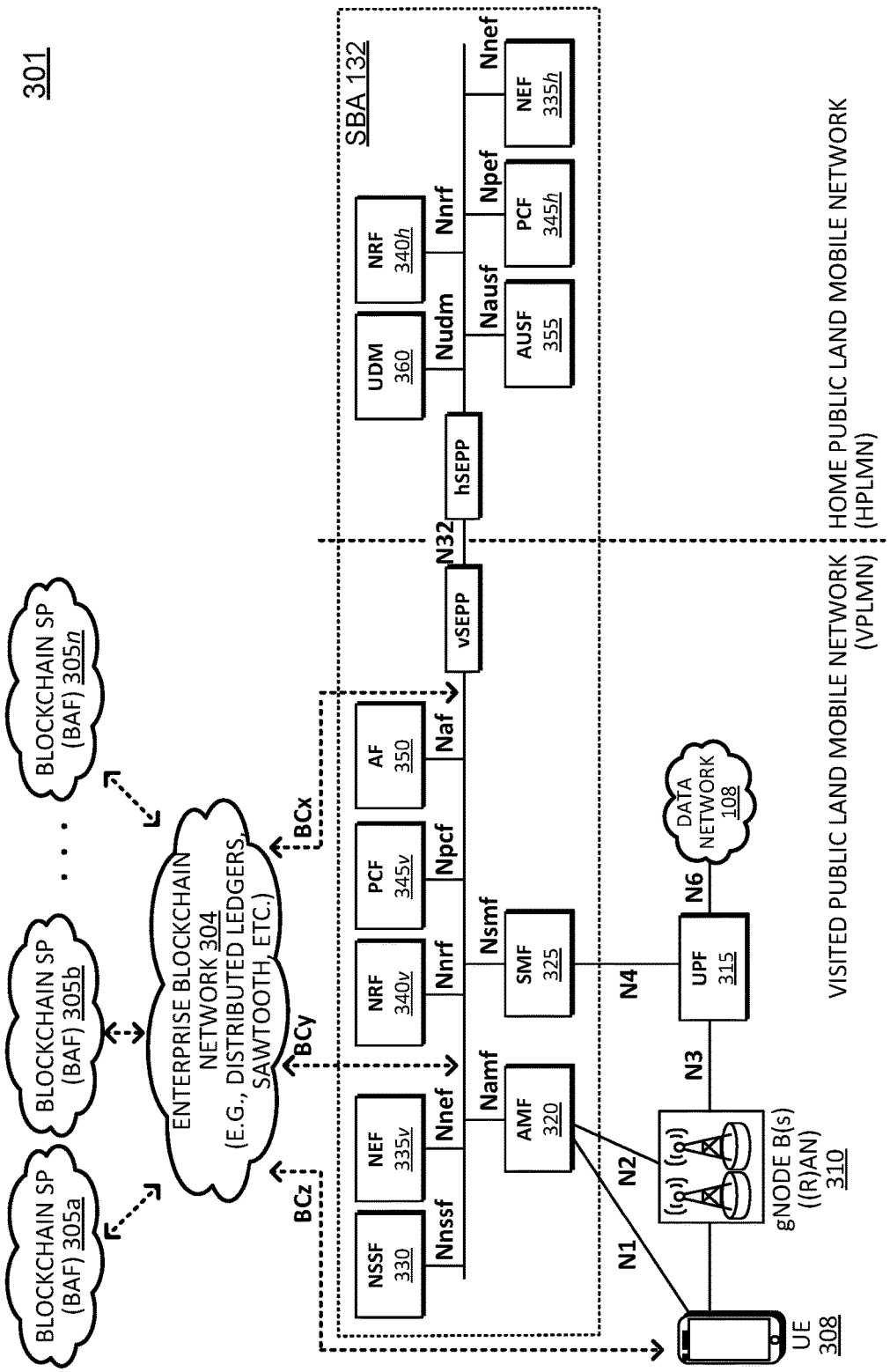
FIG. 3A illustrates schematic block diagram of a roaming architecture with a local breakout scenario for a service based interface representation of a Service Based Architecture (SBA)
Figure 3B:
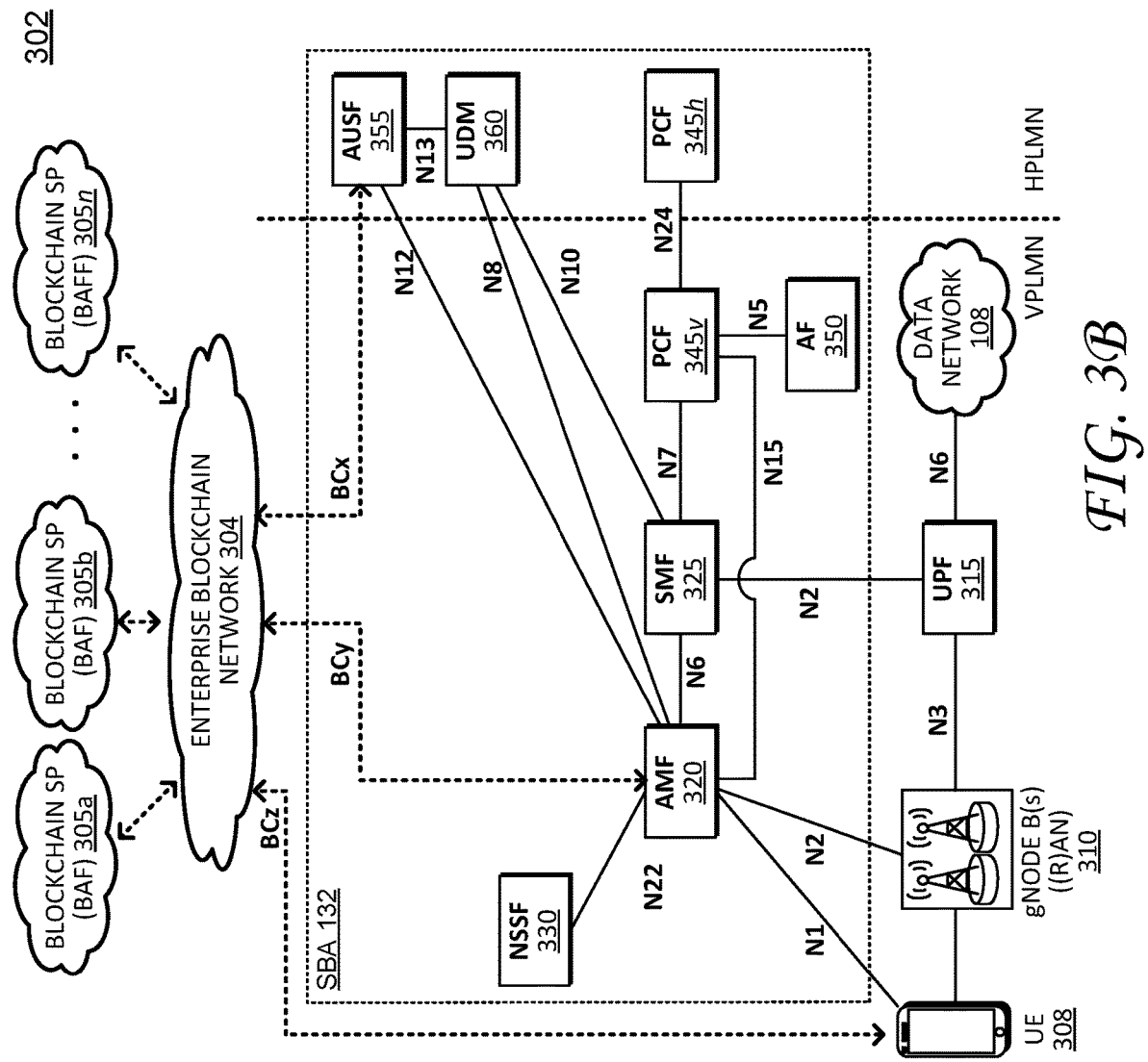
FIG. 3B illustrates a schematic block diagram of reference point representation of the roaming architecture shown in FIG. 3A.

Referring again to the figures, FIG. 3A illustrates a schematic block diagram 301, showing a blockchain platform natively integrated with a SBA 132 for an exemplary 5G network (e.g., 5G network 130), and FIG. 3B illustrates a schematic block diagram 302, showing a reference point architecture for the blockchain platform of FIG. 3A. Collectively, FIGS. 3A and 3B show a native blockchain platform, an enterprise blockchain network 304, which interconnects blockchain service providers (SPs) or Blockchain Authentication Function (BAF) entities 305a-305n (e.g., distributed ledger technology (DLT) entities, etc.) entities with various network entities over blockchain network interfaces BCx, BCy, and BCz. Notably, the blockchain interfaces can form network interfaces 210 for device/entity 200, discussed above.

The blockchain interfaces represent communication links that facilitate an exchange of messages or data packets between BAF(s) and SBA 132 (e.g., NFs that form SBA 132. In particular, BCx can facilitate exchanging messages related to policy request, authorization, network usage, lawful intercept, accounting, and the like. BCy can facilitate exchanging messages related to secondary authentication, authorization, resource sharing, lawful intercept, network slicing, etc. BCz can facilitate exchanging messages related to standalone Authentication public key pre-set, authorization, Distributed Ledger Technology query/set, etc.

Blockchain network 304 generally facilitates sharing network resources or access to network functions (NFs) such as Access and Mobility Management Function (AMF), Session Management Function (SMF), Network Repository Function (NRF), and so on, with User Equipment (e.g., UE 308), and creates specific trust boundaries across multiple service providers using distributed blockchain ledgers, as discussed in greater detail herein. Blockchain network 304 may represent an open source blockchain network or platform such distributed ledgers, hyperledger Sawtooth, and the like.

With specific reference to FIG. 3A, schematic block diagram 301 illustrates a roaming architecture with a local breakout scenario for a service based interface representation of SBA 132. As shown, this roaming architecture includes a Visited Public Land Mobile Network (VPLMN) and a Home Public Land Mobile Network (HPLMN). A Public Land Mobile Network (PLMN) is a network established and operated by a carrier for providing mobile communication services to its subscribers. Generally, domestic subscribers for a carrier use roaming if to receive services from abroad. A HPLMN refers to the subscriber's home network (e.g., domestic carrier) while VPLMN refers to the subscriber's abroad network (where the UE may be registered while roaming). While FIG. 3A illustrates the roaming architecture with the local breakout scenario, it is appreciated other roaming architectures may be employed (e.g., home routing, etc.). Further, as shown here, some network entities such as the Session Management Function (SMF) and the User Plane Function(s) (UPF(s)) involved in a PDU session are under the control of the VPLMN.

As shown, the network entities that form SBA 132 include AMF 320, SMF 325, Network Slice Selection Function (NSSF) 330, Network Exposure Function (NEF) 335v|335h, Network Repository Function (NRF) 340v|340h, Policy Control Function (PCF) 345v|345h, and Application Function (AF) 350. These network entities can be implemented either as a network element on a dedicated hardware, as a software instance running on a dedicated hardware, or as a virtualized function instantiated on an appropriate platform, e.g., a cloud infrastructure, as is appreciated by those skilled in the art.

In general, UE 308 connects to RAN/Access Network (AN) 310 as well as AMF 320. Here, the RAN can include a base station while the AN can include a base station supporting non-3GPP access, e.g., Wi-Fi access. AMF 320 provides UE-based authentication, authorization, mobility management, etc. SMF 325 is responsible for session management, IP address allocation to UE(s), and traffic management/selection of a User Plane Function (UPF) (e.g., UPF 315) for proper routing/data transfer. If UE 308 has multiple sessions, different SMFs may be allocated to each session for individual management and/or different functionality per session. AF 350 generally provides information on packet flows to PCF 345v, which is responsible for policy control in order to support Quality of Service (QoS). Based on the information from AF 350, PCF 345v determines policies about mobility and session management for proper AMF/SMF operations. AUSF 355 stores authentication data for UE 308, and UDM 360 stores subscription data for UE 308. Data network 108 provides Internet access or operator services. The foregoing operations (and additional functionality) for respective network entities can be found in 3GPP Technical Specification (TS) 23.501 v 15.2.0 and TS 23.502v15.2.0, which is incorporated by herein by reference to its entirety.

Figure 4A:
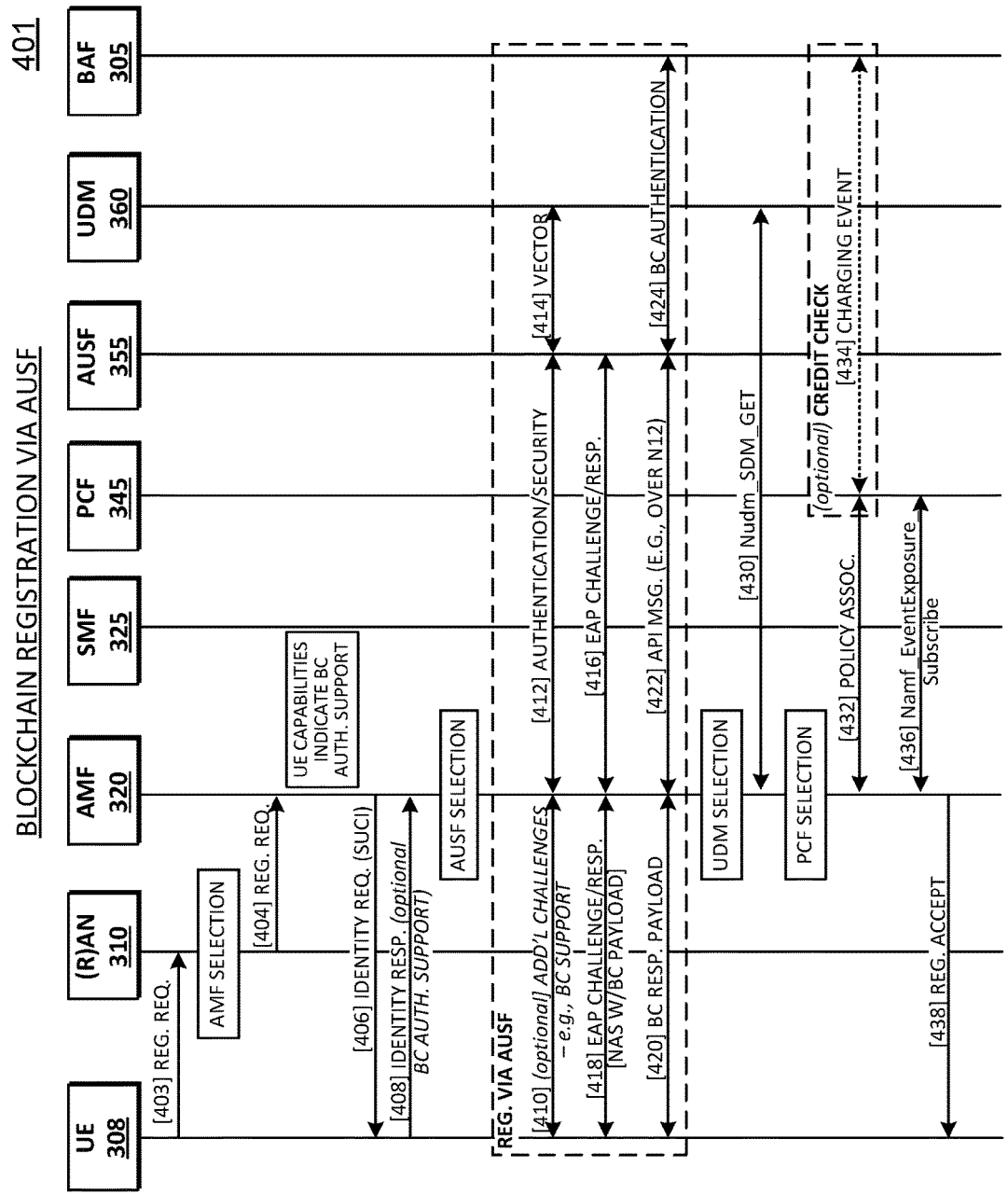
FIG. 4A illustrates a schematic signaling diagram, showing a blockchain authentication procedure that invokes an Access and Mobility Management Function (AMF) entity.
Figure 4B:
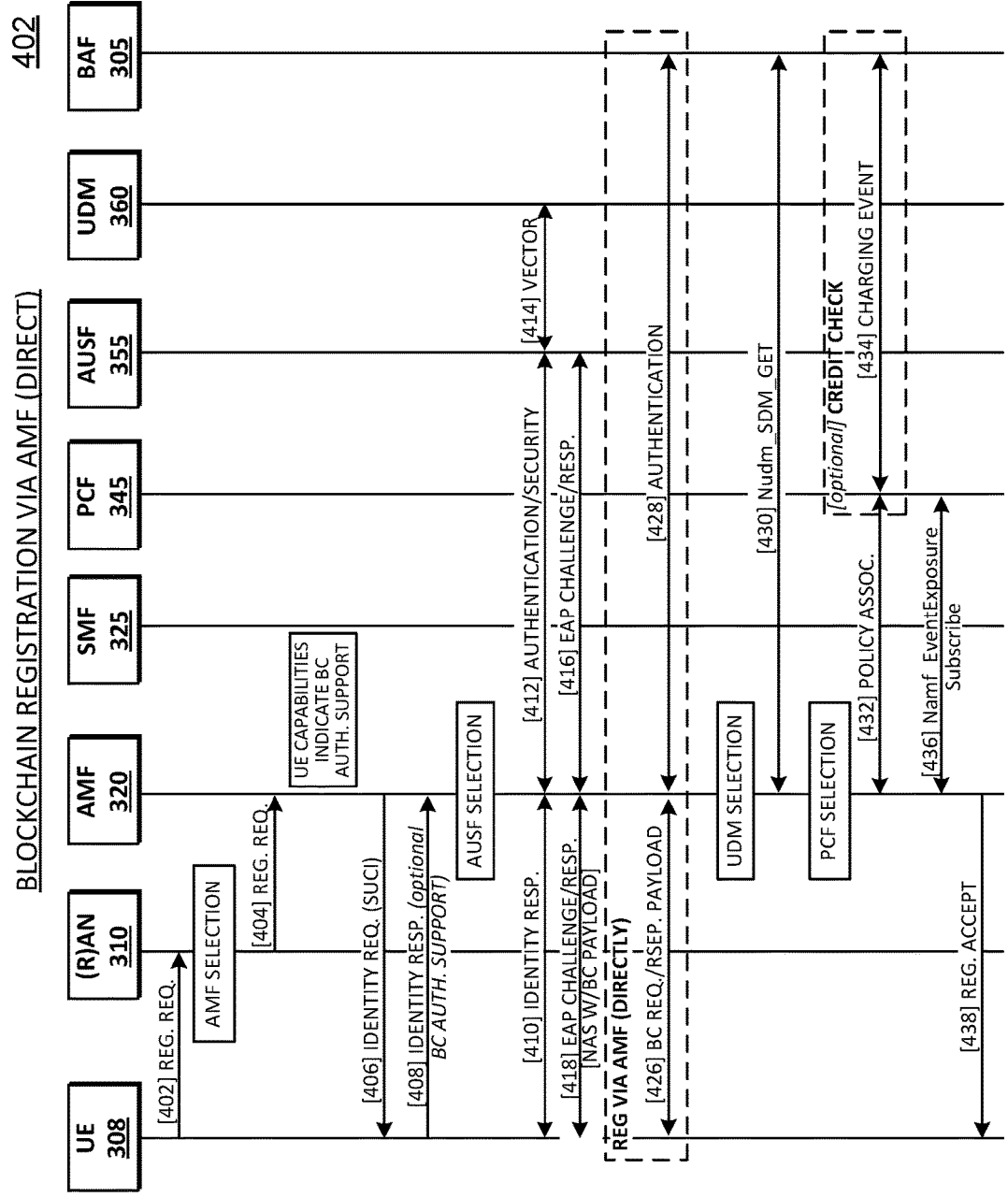
FIG. 4B illustrates a schematic signaling diagram, showing a blockchain authentication procedure performed between an Access and Mobility Management Function (AMF) entity and a Blockchain Authentication Function (BAF) entity.
Figure 5:
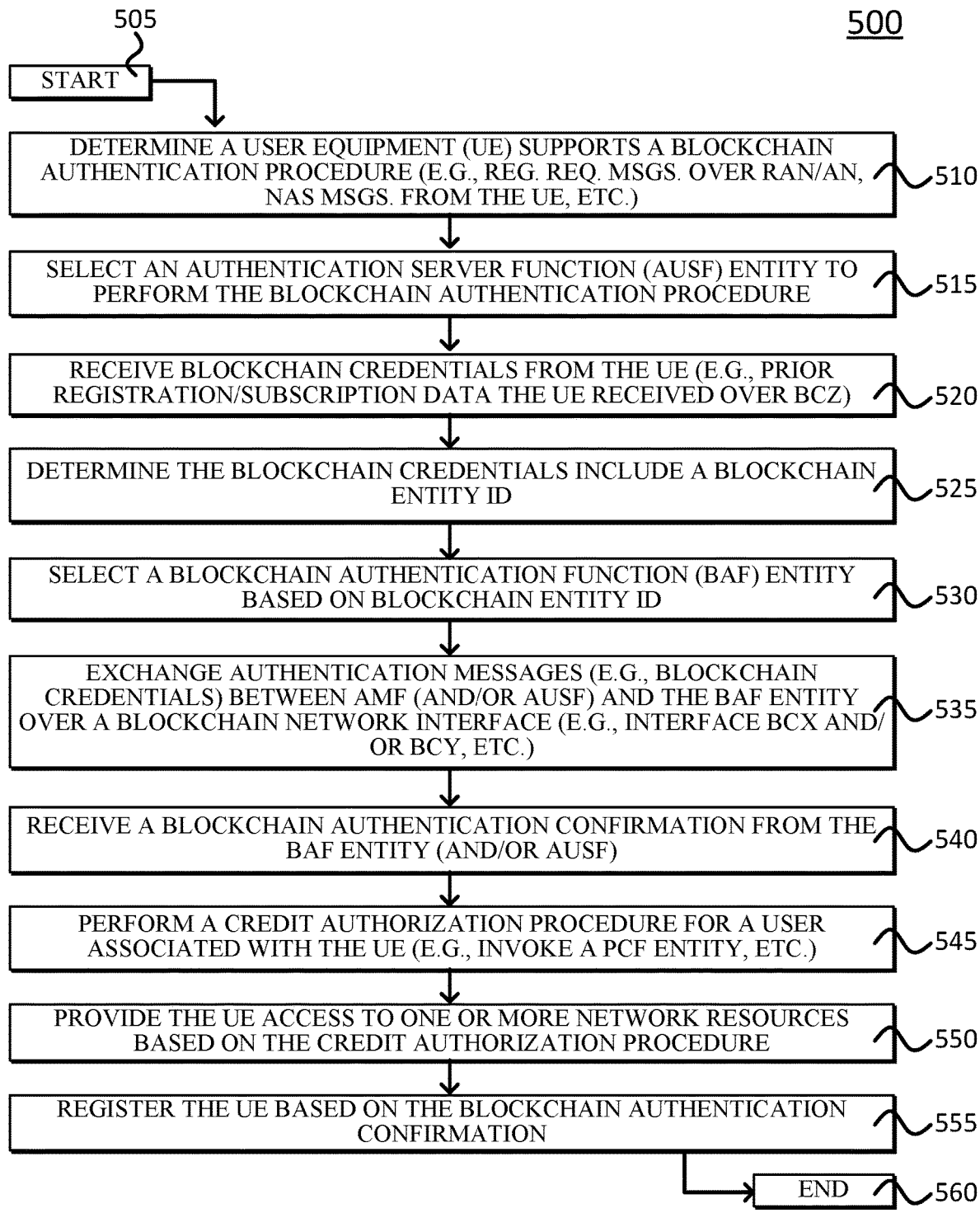
FIG. 5 illustrates an example simplified procedure for registering User Equipment (UE) in a communication network, in accordance with one or more embodiments of the blockchain authentication procedure.

FIG. 3B illustrates a schematic block diagram 302, showing a reference point interface representation of SBA 132 (e.g., with a local breakout scenario). Reference point representations often help develop detailed call flows in a normative standardization, which are illustrated in FIGS. 4A, 4B, and 5 (and described in greater detail below). It should be noted, for sake of clarity, certain network entities (e.g., NEF 335, NRF 340, etc.) are not shown by schematic block diagram 302. However, it is appreciated any of the illustrated network entities can interact with the non-illustrated entities as appropriate.

As mentioned, the native blockchain platform shown in FIGS. 3A and 3B includes enterprise blockchain network 304, which interconnects various blockchain service providers (SPs), represented as Blockchain Authentication Function (BAF) entities 305a-305n, with various mobile network entities over blockchain network interfaces BCx, BCy, and BCz. In general, this native blockchain platform provides an additional and/or alternative blockchain authentication procedure for registering UE, such as UE 308. Notably, this blockchain authentication procedure may be represented by blockchain authentication process/services 244 (ref. FIG. 2).

Continuing to refer to FIGS. 3A and 3B, RAN/Access Network (AN) 310 broadcasts system information (e.g., PLMN-IDs) to various UE(s), including UE 308. UE 308 receives the PLMN-ID from RAN/Access Network (AN) 310 and, during its initial registration, UE 308 indicates support for a complimentary (and/or substitute) blockchain authentication procedure. For example, UE 308 can indicate support for the blockchain authentication procedure in a radio layer message (e.g., a Radio Resource Control (RRC) message) sent to RAN/Access Network (AN) 310.

RAN/Access Network (AN) 310 receives the RRC messages from UE 308 and selects an appropriate AMF 320 and/or redirects the RRC messages to a new AMF as appropriate. Here, RAN/AN 310 can determine the RRC message from UE 308 include an indication to perform the blockchain authentication procedure (e.g., in an access category) and selects AMF 320 and/or redirects to a new AMF based on its capability to support the blockchain authentication procedure.

As discussed in greater detail below, AMF 320 can perform the blockchain authentication procedure by exchanging authentication messages with one or more Blockchain Authentication Function (BAF) entities (e.g., BAF(s) 305a-n) over blockchain network interfaces BCx and/or BCy.

The blockchain authentication procedure generally refers to authentication messages exchanged between one or more core NFs and a BAF, which is exposed to the core NFs over the new blockchain network interfaces. The authentication messages provide the BAF with UE credentials and the BAF, in turn, compares the UE credentials against UE credentials stored on a blockchain or distributed ledger. As is appreciated by those skilled in the art, the BAF returns authentication confirmation messages if the UE credentials match the UE credentials stored on the blockchain or distributed ledger.

For example, FIGS. 4A and 4B provide signaling diagrams showing different embodiments of the blockchain authentication procedure. In particular, in one embodiment, AMF 320 may send authentication messages to invoke/request that AUSF 355 perform blockchain authentication, which causes AUSF 355 to authenticate UE 308 with BAF 305 over blockchain network interface BCx (e.g., ref FIG. 4A), while in other embodiments, AMF 320 can directly authenticate UE 308 with BAF 305 over blockchain network interface BCy (e.g., ref. FIG. 4B), using for example, REST Application Program Interface (API) messages.

In general, UE 308 may indicates support for the blockchain authentication procedure to AMF 320 using RRC messages over RAN/AN network interfaces (which are further transmitted to AMF 320) and/or UE 308 may send a Non-Access Stratum (NAS) messages directly to AMF 320 (e.g., over network interface N1), which NAS messages indicate UE 308 supports/request the blockchain authentication procedure. For these NAS layer messages, the indication can be included directly in a NAS message (e.g., as payload data such as registration type) and/or in follow-on request (e.g., follow-on request data).

In addition, AMF 320 and/or AUSF 355 may still perform conventional authentication processes, depending on service provider or mobile network operator security/integrity policies, as is appreciated by those skilled in the art—e.g., generating/creating encryption keys (e.g., anchor keys), sending authentication requests to AUSF 355, selecting UDM 360, retrieving vectors, e.g., credentials and/or encryption keys, from UDM 360, and so on. In this fashion, the blockchain authentication procedure can complement (or augment) existing authentication processes (e.g., 5G Extensible Authentication Protocol (EAP)—Authentication and Key Agreement (AKA) procedures defined by 3GPP TS 33.301, etc.) to serve as an enhanced or secondary form of security, while in other embodiments, the blockchain authentication procedure can replace existing authentication processes (e.g., if existing authentication processes fail.

As mentioned, FIGS. 4A and 4B illustrate respective schematic signaling diagrams 401/402 for the disclosed a blockchain authentication procedure where AMF 320 invokes AUSF 355 in diagram 401, and AMF 320 directly authenticates UE 308 with BAF 305. In general, UEs register with the network in order to receive network services, enable mobility tracking, and support mobility/reachability. Notably, the call flow for registration procedures can vary based on initial registrations, mobility registration updates, periodic registration updates, and so on. FIGS. 4A and 4B illustrate an initial registration procedure in accordance with embodiments of the disclosed blockchain authentication procedure, however it is appreciated the call flows may be modified based the type of UE registration.

Blockchain Registration Process via AUSF

Referring now to FIG. 4A, schematic signaling diagram 401 begins at step 403, where UE 308 sends a registration request message to RAN/AN 310. In one embodiment, the registration request message can indicate UE 308 supports a blockchain authentication procedure in, for example, data fields such as access categories/access identities for existing registration messages (e.g., in accordance with access identities/access categories and RRC establishment clauses specified by 3GPP TS 24.501, table 4.5.6.1 (below)).

| Access identities | Access categories | RRC establishment cause is set to |
|---|---|---|
| 0 | 0 (= MT_acc) | MT access |
|  | 1 (= delay tolerant) | FFS |
|  | 2 (= emergency) | Emergency call |
|  | 3 (= MO_sig) | MO signaling |
|  | 4 (= MO MMTel voice) | MO voice call |
|  | 5 (= MO MMTel video) | FFS |
|  | 6 (= MO SMS and SMSoIP) | FFS |
|  | 7 (= MO_data) | MO data |
| 1 | Any category | "High priority access" |
| 2 | Any category | "High priority access" |
| 11, 15 | Any category | "High priority access" |
| 12, 13, 14, | Any category | "High priority access" |

NOTE:
See subclause 4.5.2, table 4.5.2.1 for use of the access identities of 0, 1, 2, and 11-15.

Next, RAN/AN 310 selects an AMF—here, AMF 320—based on the registration message. For example, RAN/AN 310 determines the registration request message indicates UE 308 supports the blockchain authentication procedure, and can select an appropriate AMF that likewise supports such procedure. Alternatively, RAN/AN 310 can reject the blockchain authentication request, which causes the UE to revert to exiting 3GPP behaviour.

At step 404, RAN/AN 310 sends a registration request message to AMF 320. As mentioned, these registration request messages (and corresponding call flows) may generally follow existing registration procedures such as those specified in 3GPP TS 23.502 (e.g., 4.2.2.2). However, in accordance with the disclosed blockchain authentication procedure, the registration request message may further include a registration type information element (e.g., 5GS registration type information element, defined in 3GPP TS 24.501, 9.8.3.7) that indicates guest access with the additional blockchain mechanisms (e.g., the blockchain authentication procedure).

For example, the 5GS registration type information element is provided below:

| 9.8.3.7.1: 5GS registration type information element |  |  |  |  |  |  |  |
|---|---|---|---|---|---|---|---|
| 8 | 7 | 6 | 5 | 4 | 3 | 2 | 1 |
| 5GS regstration type IEI |  |  |  | FDR | 5GS registration type value |  | octet 1 |

| 9.8.3.7.1: 5GS registration type information element |
|---|
| 5GS registration type value (octet 1) |

| Bits | | |
|---|---|---|
| 3 | 2 | 1 |
| 0 | 0 | 1 | initial registration |
| 0 | 1 | 0 | mobility registration updating |
| 0 | 1 | 1 | periodic registration updating |
| 1 | 1 | 0 | emergency registration |
| 1 | 1 | 1 | reserved |

All other values are unused and shall be interpreted as "initial registration" if received by the network.

| Follow-On Request bit (FOR) (octet 1) |
|---|
| Bit 4 |
| 0 — No follow-on request pending |
| 1 — Follow-on request pending |

In one embodiment, the 5GS registration type information element can enable a follow-on attribute and/or set the follow-on-request bit, which can indicate support or information corresponding to the blockchain authentication procedure. In another embodiment, the 5GS registration type information element can be modified to include a registration type that indicates the guest authenticating mechanism (e.g., the blockchain authentication procedure).

As discussed in greater detail below, the blockchain authentication procedure, whether indicated in the registration request message with the follow-on request bit or the modified registration type, can include a non-3GPP authentication procedure piggy backed over a Non-Access Stratum (NAS) message. For example, the blockchain authentication procedure could be carried in a transparent container payload of the NAS protocol where the authentication type can be indicated in a NAS payload. Notably, in accordance with network service provider or operator policy/requirements, AMF 320 may first perform standard EAP-AKA procedures (e.g., as defined by 3GPP TS 33.301, 6.1.2 and 6.1.3), and if successful, AMF 320 may further perform the blockchain authentication procedure as a complimentary or supplemental process. However, as mentioned above, in some instances, AMF 320 may perform the blockchain authentication procedure and register/attach UE 308 to the network even if the standard EAP-AKA procedures fail (depending on policy/requirements).

Signaling diagram 401 continues to steps 406 and 408 where UE 308 and AMF 320 exchange identity request/response messages. Here, AMF 320 initiates a UE identity request at step 406 during an initial registration, e.g., when AMF 320 is new to UE 308, and/or when AMF 320 was not provided Subscriber Concealed Identifier (SUCI) information from prior AMF(s) (e.g., in accordance with 3GPP TS 23.502 procedures). As shown, AMF 320 particularly initiates authentication with UE 308 by sending an identity request message at step 406 and, in response, UE 308 generates and transmits, a corresponding identity response (e.g., with a SUCI or privacy preserving identifier containing a concealed subscriber permanent identifier (SUPI)) in step 408.

In some embodiments, UE 308 returns additional parameters at step 408 to indicate support for the blockchain authorization procedure (e.g., in addition to or as an alternative to the above discussed indications in 5GS registration type information). After step 408, AMF 320 initiates UE authentication processes with an AUSF and selects AUSF 355 based on, for example, SUCI/SUPI information (described in 3GPP TS 23.501) and/or the indicated support for the blockchain authorization procedure.

Steps 410-424 illustrate the blockchain authentication procedure employed by AUSF 355 in conjunction with conventional authentication calls (e.g., as specified by 3GPP TS 33.501) between AMF 320, AUSF 355, and UDM 360. As described below, the ordering and exchange messages represented by steps 410-424 reflect various bi-lateral message exchanges.

In particular, step 410 provides optional challenges/responses between AMF 320 and UE 308, which allow UE 308 to indicate support for the blockchain authorization procedure in NAS messages sent to AMF 320 (e.g., over network interface N1).

At step 412, AMF 320 can invoke existing authentication services by sending an authentication request message to AUSF 355. In response, AUSF 355 checks that the requesting AMF in the serving network is entitled to use the serving network and sends, at step 414, a corresponding authentication request message to UDM 360. UDM 360 generates and sends an authentication vector (e.g., security keys, etc.) to AUSF 355, again at step 414.

AUSF 355 also exchanges EAP-Requests/AKA-Challenges with AMF 320, at step 416, which further solicit EAP challenges/responses from UE 308, at step 418. As shown, the EAP challenges/responses between UE 308 and AMF 320 can include NAS messages with blockchain payload data to provide AMF 320 (and thus AUSF 355 at step 416) relevant blockchain authentication information (e.g., UE 308 registration information with prior BAF entities, etc.) for subsequent or secondary authentication with BAF 305 (e.g., step 424 discussed below). In accordance with existing authentication protocols, and based on the EAP challenges/responses received by AUSF 355 at step 416, AUSF 355 can complete UE authentication with UDM 360 at step 414.

Collectively, the messages exchanged at steps 410-416 can confirm/accept the UE's credentials or deny/reject the UE's credentials based on existing authentication protocols. In addition, these messages can provide appropriate security context/acknowledgements between UE 308, AMF 320, AUSF 355, and UDM 360, which protect/encrypt subsequent messages from UE 308.

Regardless of success/failure of UE authentication in steps 410, AMF 320 and AUSF 355 may further perform the blockchain authentication procedure (e.g., as a complimentary/substitute authentication procedure). In this fashion, the blockchain authentication procedure can thought of as an extension to existing calls and/or may include additional flags/parameters in appropriate messages.

Depending on policies and/or security requirements, AMF 320 may continue on to perform the blockchain authentication process with AUSF 355. As mentioned above, AMF 320 can receive relevant blockchain authentication information from UE 308 in the course of exchanging authentication messages based on existing procedures, or alternatively, UE 308 can send separate NAS messages to AMF 320 with the blockchain authentication information included in payload data, such as shown at step 420. The blockchain authentication information is used by AMF 320/AUSF 355 to authenticate UE 308 with BAF 305. For example, the blockchain authentication information can include a blockchain entity ID that corresponds to BAF 305 as well as blockchain credentials, such as blockchain registration information, blockchain subscription information, and so on. Preferably, UE 308 registers and subscribes to BAF 305 (e.g., over blockchain network interface BCz) to obtain the blockchain authentication information. AMF 320 receives these NAS messages, identifies the blockchain entity ID, and selects an appropriate BAF (here, BAF 305) based on the blockchain entity ID.

AMF 320 further invokes AUSF 355, at step 422, to continue the blockchain authentication procedure and authenticate UE 308 with BAF 305 using, for example, a Nausf service call over the N12 network interface. In this fashion, AMF 320 sends service-based API messages (e.g., as defined by 3GPP TS 29.509 and TS 29.518) with appropriate blockchain authentication flags/parameters/payload/etc. to AUSF 355.

AUSF 355 receives the API messages and exchanges, at step 424, blockchain authentication messages with BAF 305 over blockchain network interface BCx. AUSF 355 further sends these blockchain authentication messages to AMF 320 (e.g., blockchain authentication confirmation, etc.) so AMF can complete the blockchain authentication procedure. It is appreciated the blockchain authentication procedure may require additional messages to handle situations where BAF 305 is slow to respond, is unavailable or out of service, and/or fails to confirm the UE credentials. In these situations, AMF 320 may send temporary Ack messages to UE 308 to provide additional processing time for BAF 305 to authenticate the UE credentials.

In sum, steps 420-424 represent blockchain authentication operations where AMF 320 receives identifying information for the BAF associated with UE 308 and selects BAF 305 based on the identifying information (e.g., steps 420-422), and completes the authentication transaction by acting as an agent of UE 308 since UE 308 may be considered a client of BAF 305 (e.g., steps 424). Preferably, UE 308 previously registered and subscribed to BAF 305 over blockchain interface BCz.

Once UE 308 is successfully authenticated with the blockchain authentication procedure, signaling diagram continues to steps 430, 432, 436, and 438, which include messages to complete UE 308 registration in accordance with 3GPP TS 23.502 (e.g., UDM selection/update, PCF selection, registration acceptance, and so on).

In some embodiments of this disclosure, the blockchain authentication procedure may also include an optional credit check for UE 308, shown as a charging event at step 434. Notably, this credit check represents a charging authorization procedure that can be performed after UE 308 is authenticated with BAF 305 but before AMF 320 completes registration and attaches UE 308 to the SBA network.

In operation, PCF 345 manages mobility credentials for UE 308 and performs the credit authorization procedure with BAF 305 in an authorization layer. The credit authorization procedure determines if UE 308 (and its corresponding user) can complete a transaction (e.g., can the user pay for the transaction now or at a future time), the type and/or number of network services the user can afford (e.g., which can limit or restrict access to network resources), and so on. For example, in an Internet of Things (IoT) context, PCF 345 can use the credit authorization procedure to determine virtual contract information (e.g., credit worthiness) associated with UE 308, which can be shared with other network entities/services (e.g., NFs) in SBA 132.

As mentioned above, steps 430, 432, 436, and 438 include messages to complete UE 308 registration in accordance with 3GPP TS 23.502.

Blockchain Secondary Authentications Using AMF

In other embodiments of this disclosure, AMF 320 may directly perform the blockchain authentication procedure with BAF 305 (e.g., after, for example, AMF 320 successfully obtains an appropriate security context/acknowledgements from AUSF 355/UDM 360), which ensure encryption/integrity protection for messages exchanged with UE 308.

In particular, signaling diagram 402 of FIG. 4B shows AMF 320 directly performing the blockchain authentication procedure with BAF 305. Notably, signaling diagram 402 includes many of the same steps or calls shown in signaling diagram 401, which are discussed above.

In addition to the steps shown in signaling diagram 401, signaling diagram 402 further provides steps 426 and 428, which represent AMF 320 operations to directly exchange blockchain authentication messages with BAF 305. In particular, at step 426, UE 308 exchanges blockchain authentication information with AMF 320 using, for example, NAS messages that can include blockchain payload data. The blockchain authentication information is used by AMF 320 to authenticate UE 308 with BAF 305. As mentioned, the blockchain authentication information can include a blockchain entity ID that corresponds to BAF 305 as well as blockchain credentials, such as blockchain registration information, blockchain subscription information, and so on. AMF 320 receives these NAS messages and selects an appropriate BAF (here, BAF 305) based on the blockchain entity ID. AMF 320 further authenticates UE 308 with BAF 305 at step 428 and may receive an authentication confirmation from BAF 305.

Steps 430, 432, 436, and 438 represent messages for completing UE registration in accordance with 3GPP TS 23.502.

FIG. 5 illustrates an example simplified procedure 500 for registering User Equipment (UE) in accordance with one or more embodiments of the blockchain authentication procedure. Procedure 500 can represent operations of a blockchain authentication process (e.g., blockchain authentication process/services 244) that may be performed by one or more NF entities (e.g., NF/device 200) and can include, for example, an AMF entity (AMF 320) and/or an AUSF entity (AUSF 355).

Procedure 500 begins at step 505 and continues on to step 510 where, as discussed above, the AMF determines User Equipment (UE) (e.g., UE 308) supports a blockchain authentication procedure. For example, the AMF can determine the UE supports the blockchain authentication procedure from a Radio Request Control message (RRC) such as a registration request message and/or a Non-Access Stratum message received from the UE (e.g., in a registration type field, a NAS payload field, follow-on request data, etc.). Notably, in some embodiments, the RAN/AN in communication with the UE may select the AMF based on the indicated support for the blockchain authentication procedure.

Procedure continues to step 515 where the AMF optionally selects or invokes an Authentication Server Function (AUSF) entity to perform the blockchain authentication procedure. As discussed above, the AMF may directly communicate and authenticate the UE with a Blockchain Authentication Function (BAF) entity (e.g, BAF 305), or it may invoke an AUSF to perform the blockchain authentication procedure.

In step 520, the AMF receives blockchain credentials from the UE. The blockchain credentials refer to blockchain authentication information and can include blockchain registration/subscription information. In some embodiments, the UE receives the blockchain credentials from the BAF entity over a blockchain network interface (e.g., BCz).

The AMF further determines, at step 525, the blockchain credentials include a blockchain entity ID, and selects, at step 530, the BAF (e.g., BAF 305) for blockchain authentication based on the same.

The AMF also exchanges authentication messages, at step 535 with the BAF. As mentioned, the AMF exchange the authentication messages directly with the BAF (e.g., over a blockchain network interface BCy or indirectly (e.g., through the AUSF entity, which communicates with the BAF entity over a blockchain network interface BCz). The AMF receives, at step 540, a blockchain authentication confirmation from the BAF entity (again, either directly or indirectly through the AUSF entity). Notably, in some embodiments, the BAF entity may require additional processing time to validate the UE's credentials. In these embodiments, the AMF may send temporary Ack. messages to the UE to accommodate the additional processing time.

The AMF can optionally invoke, at step 545, a Policy Control Function (PCF) entity (e.g., PCF 345) to perform a credit authorization procedure (e.g., in an authorization layer) for a user associated with the UE. As mentioned above, the credit authorization procedure can determine a scope of network services (e.g., access or restrict) to be provided to the UE based on the credit worthiness of the user. In some embodiments, this information may be included as part of a virtual contract that can be shared with various NFs. Next, the PCF can provide, at step 545, the UE access to one or more network resources based on the credit authorization procedure (e.g., credit worthiness of the user). Finally, the AMF registers the UE at step 555.

Procedure subsequently ends at step 560, but may return again to step 510 where the AMF determines another UE supports the blockchain authentication procedure.

It should be noted that while certain steps within procedure 500 may be optional, and further, the steps shown in FIG. 5 are merely example steps for illustration—certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a native blockchain platform for wireless networks. This native blockchain platform supports new use cases that create opportunities to share network resources across multiple provider networks, increase workload mobility security, improve billing/mediation and reconciliation and create mechanisms for roaming authentication/registration using blockchain technology. In addition, the native blockchain platform provides new opportunities for the app economy and creates a new market place for Mobile virtual network operators (MVNO) participation. As discussed above the native blockchain platform facilitates new methods for authenticating UE when attaching the UE to the network as well as new methods to facilitate payments for network services as part of blockchain charging events.

While there have been shown and described illustrative embodiments of the native blockchain platform and corresponding operations in a specific network context (e.g., a mobile core network for a 5G network), it is to be understood that various other adaptations and modifications may be made within the spirit and scope of the embodiments herein. For example, the embodiments and operations disclosed herein have been described with respect to certain devices, NFs, interfaces, and systems, however it is appreciated that such embodiments are provided for purposes of example, not limitation and that the blockchain authentication techniques disclosed herein can be incorporated as part of existing wireless networks.

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for registering User Equipment in a communication network, the method comprising:
   determining, by an Access and Mobility Management Function (AMF) entity, a User Equipment (UE) supports a blockchain authentication procedure;
   first receiving, by the AMF entity, blockchain credentials from the UE;
   determining, by the AMF entity, the blockchain credentials include a blockchain entity identifier (ID);
   selecting, by the AMF, from amongst a plurality of available Blockchain Authentication Function (BAF) entities a particular BAF entity based on the blockchain entity ID;
   exchanging, after the selecting, authentication messages between the AMF entity and the selected BAF entity over a blockchain network interface, based on the blockchain authentication procedure;
   second receiving, by the AMF entity, a blockchain authentication confirmation from the BAF entity; and
   registering, by the AMF entity, the UE based on the blockchain authentication confirmation.

2. The method of claim 1, wherein exchanging authentication messages between the AMF entity and the BAF entity further comprises:
   selecting an Authentication Server Function (AUSF) entity to perform the blockchain authentication procedure; and
   sending a blockchain authentication request to the AUSF entity to cause the AUSF entity to authenticate the UE with the BAF entity over a blockchain network interface, and
   wherein receiving the authentication confirmation further comprises receiving the authentication confirmation from the AUSF entity.

3. The method of claim 1, further comprising:
   receiving, by the AMF entity, blockchain credentials in a Non-Access Stratum (NAS) message from the UE, and wherein exchanging the authentication messages further comprises exchanging the blockchain credentials between the AMF entity and the BAF entity.

4. The method of claim 3, wherein the blockchain network interface is a first blockchain network interface, wherein the UE receives the blockchain credentials from the BAF entity over a second blockchain network interface.

5. The method of claim 1, further comprising between the second receiving and the registering:
performing a credit authorization procedure for a user associated with the UE; and
providing the UE access to one or more network resources based on the credit authorization procedure.

6. The method of claim 5, wherein performing the credit authorization procedure further comprises invoking, by the AMF, a Policy Control Function entity to perform the credit authorization procedure.

7. The method of claim 1, wherein determining the UE supports the blockchain authentication procedure further comprises:
receiving, by the AMF entity, a registration request message associated with the UE over at least one of a Radio Access Network (RAN) interface or an Access Network (AN) interface; and
determining the registration request message indicates the UE supports blockchain authentication in an access category.

8. The method of claim 1, wherein determining the UE supports the blockchain authentication procedure further comprises:
receiving, by the AMF entity, a Non-Access Stratum (NAS) message associated with the UE; and
determining the NAS message indicates the UE supports the blockchain authentication procedure based on at least one of registration type data or follow-on request data.

9. The method of claim 1, wherein exchanging authentication messages between the AMF entity and the BAF entity further comprises exchanging one or more REST Application Program Interface (API) messages between the AMF entity and the BAF entity.

10. A network function (NF) device, comprising:
one or more network interfaces to communicate within a communication network;
a processor coupled to the network interfaces and adapted to execute one or more processes; and
a memory configured to store instructions executable by the processor, the instructions when executed operable to:
determine a User Equipment (UE) supports a blockchain authentication procedure;
first receive, by the AMF entity, blockchain credentials from the UE;
determine, by the AMF entity, the blockchain credentials include a blockchain entity identifier (ID);
select, by the AMF, from amongst a plurality of available Blockchain Authentication Function (BAF) entities a particular BAF entity based on the blockchain entity ID;
exchange, after the select, authentication messages with the selected BAF entity over a blockchain network interface, based on the blockchain authentication procedure;
second receive a blockchain authentication confirmation from the BAF entity; and
register the UE based on the blockchain authentication confirmation.

11. The NF device of claim 10, wherein the instructions to exchange authentication messages with the BAF entity are further operable to:
select an Authentication Server Function (AUSF) entity to perform the blockchain authentication procedure; and
send a blockchain authentication request to the AUSF entity to cause the AUSF entity to authenticate the UE with the BAF entity over a blockchain network interface, and
wherein the instructions to receive the authentication confirmation message are further operable to receive the authentication confirmation message from the AUSF entity.

12. The NF device of claim 10, wherein the instructions, when executed, are further operable to:
receive blockchain credentials in a Non-Access Stratum (NAS) message from the UE, and
wherein the instructions to exchange the authentication messages are further operable to send the blockchain credentials to the BAF entity.

13. The NF device of claim 10, wherein the instructions, when executed, are further operable to between the second receive and the register:
perform a credit authorization procedure for a user associated with the UE; and
provide the UE access to one or more network resources based on the credit authorization procedure.

14. A tangible, non-transitory, computer-readable media having instructions encoded thereon, the instructions, when executed by a processor, are operable to:
determine a User Equipment (UE) supports a blockchain authentication procedure;
first receive, by the AMF entity, blockchain credentials from the UE;
determine, by the AMF entity, the blockchain credentials include a blockchain entity identifier (ID);
select, by the AMF, from amongst a plurality of available Blockchain Authentication Function (BAF) entities a particular BAF entity based on the blockchain entity ID;
exchange, after the select, authentication messages with the selected BAF entity over a blockchain network interface, based on the blockchain authentication procedure;
second receive a blockchain authentication confirmation from the BAF entity; and
register the UE based on the blockchain authentication confirmation.

15. The tangible, non-transitory, computer-readable media of claim 14, wherein the instructions, when executed by the processor to exchange authentication messages with the BAF entity, are further operable to:
select an Authentication Server Function (AUSF) entity to perform the blockchain authentication procedure; and
send a blockchain authentication request to the AUSF entity to cause the AUSF entity to authenticate the UE with the BAF entity over a blockchain network interface, and
wherein the instructions, when executed by the processor to receive the authentication confirmation message are further operable to receive the authentication confirmation from the AUSF entity.

16. The tangible, non-transitory, computer-readable media of claim 14, wherein the instructions, when executed by the processor, are further operable between the second receive and the register to:

perform a credit authorization procedure for a user associated with the UE; and provide the UE access to one or more network resources based on the credit authorization procedure.

* * * * *